(12) United States Patent
Rittler et al.

(10) Patent No.: US 12,529,412 B2
(45) Date of Patent: Jan. 20, 2026

(54) ELECTRIC VEHICLE TRANSMISSIONS

(71) Applicant: ZF Friedrichshafen AG, Friedrichshafen (DE)

(72) Inventors: David Rittler, Neukirch (DE); Paul Lenz, Waldkirchen (DE); Stefan Renner, Bodman-Ludwigshafen (DE); Stefan Spühler, Friedrichshafen (DE); Michael Trübenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/958,509

(22) Filed: Nov. 25, 2024

(65) Prior Publication Data

US 2025/0172196 A1    May 29, 2025

(30) Foreign Application Priority Data

Nov. 28, 2023   (DE) ..................... 10 2023 211 832.7

(51) Int. Cl.
*F16H 3/64*      (2006.01)
*B60K 1/00*      (2006.01)
(Continued)

(52) U.S. Cl.
CPC ................ *F16H 3/64* (2013.01); *B60K 1/00* (2013.01); *B60K 17/08* (2013.01); *F16H 37/082* (2013.01);
(Continued)

(58) Field of Classification Search
CPC ........... F16H 2200/201; F16H 3/62–66; F16H 2200/2064; F16H 2200/2038;
(Continued)

(56) References Cited

U.S. PATENT DOCUMENTS 10,544,854 B2   1/2020  Schilder et al.
11,668,380 B2   6/2023  Renner
(Continued)

FOREIGN PATENT DOCUMENTS

CN       116592107 A  *  5/2023  ............... B60K 1/00
DE    10 2015 208 355     11/2016
(Continued)

OTHER PUBLICATIONS

German Patent Office, Search Report issued in German patent application No. 10 2023 211 832.7 (Jul. 15, 2024).

*Primary Examiner* — Ernesto A Suarez
*Assistant Examiner* — Lillian T Nguyen
(74) *Attorney, Agent, or Firm* — Finch & Maloney PLLC

(57) ABSTRACT

An electric vehicle transmission has a drive input shaft, a drive output shaft, where the input shaft is provided for coupling to an electric machine. First, second, and third planetary gearsets each comprise a first element, a second element, and a third element, respectively, in the form of a sun gear, a planetary web, and a ring gear in each case. At least functionally a first shifting element, a second shifting element, and a third shifting element are provided. The first element of the first planetary gearset is connected rotationally fixed to the drive input shaft. In addition, to produce the function of a parking brake, the third shifting element is provided, by means of which two of the elements of the second planetary gearset or of the third planetary gearset can be connected rotationally fixed to one another.

20 Claims, 3 Drawing Sheets

(51) Int. Cl.
*B60K 17/08* (2006.01)
*F16H 37/08* (2006.01)
*F16H 63/34* (2006.01)

(52) U.S. Cl.
CPC .... *F16H 63/3416* (2013.01); *B60K 2001/001* (2013.01); *F16H 2200/0021* (2013.01); *F16H 2200/0034* (2013.01); *F16H 2200/201* (2013.01); *F16H 2200/2094* (2013.01)

(58) Field of Classification Search
CPC .. B60K 2001/001; B60K 6/365; B60K 6/547; B60K 17/046; B60K 17/16
See application file for complete search history.

(56) References Cited

U.S. PATENT DOCUMENTS

| | | |
|---|---|---|
| 11,719,317 B2 | 8/2023 | Rittler et al. |
| 2009/0143185 A1 | 6/2009 | Hiramatsu |
| 2015/0167788 A1* | 6/2015 | Beck ............... F16H 3/66 |
| | | 475/269 |
| 2017/0036527 A1 | 2/2017 | Hwang et al. |
| 2019/0344660 A1 | 11/2019 | Kumar et al. |
| 2020/0262293 A1 | 8/2020 | Glückler et al. |
| 2020/0282827 A1 | 9/2020 | Kaltenbach et al. |
| 2023/0039003 A1* | 2/2023 | Beck ............... F16H 3/666 |

FOREIGN PATENT DOCUMENTS

| | | | |
|---|---|---|---|
| DE | 10 2017 11 460 | 11/2018 | |
| DE | 10 2017 006 262 A1 | 1/2019 | |
| WO | WO-2017162328 A1 * | 9/2017 | ............ B60K 1/00 |
| WO | 2019/007723 | 1/2019 | |

\* cited by examiner

|    | A | B | C |
|----|---|---|---|
| G1 | x |   |   |
| G2 |   | x |   |
| PS |   |   | x |

Fig. 3

ELECTRIC VEHICLE TRANSMISSIONS

RELATED APPLICATIONS

This application claims the benefit of and right of priority under 35 U.S.C. § 119 to German Patent Application no. 10 2023 211 832.7, filed on 28 Nov. 2023, the contents of which are incorporated herein by reference in its entirety.

FIELD OF THE DISCLOSURE

The invention relates to an electric vehicle transmission comprising a drive input shaft, a drive output shaft, a first planetary gearset, a second planetary gearset, and a third planetary gearset, wherein the drive input shaft is provided for coupling to an electric machine, wherein the first planetary gearset, the second planetary gearset and the third planetary gearset each comprise a first element, a second element, and a third element, respectively, in the form of a sun gear, a planetary web, and a ring gear in each case, wherein a first shifting element, a second shifting element, and a third shifting element are provided at least functionally, and wherein the first element of the first planetary gearset is connected rotationally fixed to the drive input shaft. In addition, the invention relates to a drive system, a vehicle drivetrain and an electric vehicle.

BACKGROUND

In electric vehicles, as part of a respective drivetrain an electric vehicle transmission is provided between an electric machine and drive wheels of the element vehicle, in particular in order to produce a gear ratio that steps down a drive movement of the electric machine to the drive wheels into the slow range. Besides single-gear electric vehicle transmissions, in electric utility vehicles transmissions are also used in which two or more gears can be engaged.

DE 10 2017 006 262 A1 describes an electric vehicle transmission provided for use in an electric vehicle. Besides a drive input shaft and a drive output shaft, this electric vehicle transmission comprises three planetary gearsets, each consisting of elements in the form of a sun gear, a planetary web, and a ring gear in each case. In the installed condition of the electric vehicle transmission, the drive input shaft serves to form a connection to an upstream electric machine. In addition, the electric vehicle transmission comprises three shifting elements in the form of frictional shifting elements, by the selective actuation of which a power flow with different transmission ratios can be produced from the drive input shaft, via the planetary gearsets to the drive output shaft.

SUMMARY

Starting from the above-described prior art, the purpose of the present invention is now to provide an electric vehicle transmission with which different gears for the connection of an electric machine can be obtained, wherein by way of the electric vehicle transmission the function of a parking brake can in addition be realized in a simple and compact manner.

This objective is achieved by a vehicle transmission as disclosed herein in combination with its characterizing features. In addition, a drive system is provided, comprising an electric vehicle transmission as disclosed herein. Also disclosed is an electric vehicle with a vehicle drivetrain of that type.

According to the invention, the electric vehicle transmission comprises a drive input shaft, a drive output shaft, and a first, a second, and a third planetary gearset, wherein the drive input shaft is designed to be coupled to an electric machine. The first planetary gearset, the second planetary gearset, and the third planetary gearset comprise in each case a first element, a second element, and a third element, respectively, in the form of a sun gear, a planetary web, and a ring gear. In addition, at least functionally a first shifting element, a second shifting element and a third shifting element are provided. The first element of the first planetary gearset is connected rotationally fixed to the drive input shaft.

In the context of the invention, a "shaft" is understood to mean a rotatable component of the transmission by way of which a power flow can be connected between components, if necessary, by the simultaneous actuation of a corresponding shifting element. The shaft concerned can connect components to one another axially, or radially, or even both axially and radially. Thus, the shaft concerned can also constitute an intermediate component by means of which, for example, a particular component can be connected radially.

In the context of the invention, "axial" means an orientation in the direction of a longitudinal axis of the transmission, parallel to which rotation axes of rotatable components of the transmission, in particular the shafts of the transmission and the elements of the planetary gearsets, are arranged. Then, "radial" is understood to mean in each case an orientation in the direction of the diameter of a respective component of the transmission.

In an electric vehicle transmission according to the invention, the drive input shaft is provided in order to form a coupling to an electric machine on the drive input side. For that purpose, the drive input shaft is in particular provided with a connection point at which a coupling of the drive input shaft to a rotor of the electric machine can be formed. In this case the coupling between the electric machine and the drive input shaft is in a form such that there is always a fixed rotation speed ratio between a rotation speed of the drive input shaft of the electric vehicle transmission and a rotation speed of the rotor of the electric machine. Thus, in the context of the invention, if appropriate at least one further gear ratio step such as a spur gear stage and/or a planetary gearset can be provided between the drive input shaft and the rotor of the electric machine, by virtue of which a preliminary transmission ratio of a rotation movement of the rotor of the electric machine can be produced at the drive input shaft. In particular, however, the drive input shaft of the electric vehicle transmission according to the invention can be connected rotationally fixed to the rotor of the electric machine so that during operation the rotor and the drive input shaft rotate at the same speed.

In the electric vehicle transmission according to the invention the drive input shaft and the drive output shaft are arranged coaxially with one another, whereby the planetary gearsets too can be positioned coaxially with the drive input shaft and the drive output shaft. In that way a particularly compact structure of the electric vehicle transmission in the radial direction can be produced.

The planetary gearsets consist in each case of a first element, a second element, and a third element, wherein the elements of the individual planetary gearsets consist in each case of a sun gear, a planetary web, and a ring gear. The individual planetary gearsets are minus planetary gearsets in which at least one planetary gearwheel is mounted to rotate on each respective planetary web, which gearwheel(s) mesh (es) both with the sun gear and with the ring gear concerned. In a design of a respective planetary gearset as a minus planetary gearset, the first element is the sun gear, the second element is the planetary web, and the third element is the ring gear.

Alternatively, in principle one or more of the planetary gearsets could be in the form of a plus planetary gearset. In that case, at least one pair of planetary gearwheels is mounted to rotate on the planetary web concerned, of which planetary gearwheels one meshes with the respective sun gear and one with the respective ring gear, while the planetary gearwheels of the at least one planetary gearwheel pair also mesh with one another. Other than with the design as a minus planetary gearset, in such a case the first element of the planetary gearset concerned is then the sun gear but the second element of the planetary gearset is the ring gear and the third element of the planetary gearset is the planetary web. Compared with a minus planetary gearset design, the stationary gear ratio of the planetary gearset concerned also has to be increased by one. In particular, in the electric vehicle transmission exactly three planetary gearsets are provided in this case.

The electric vehicle transmission according to the invention also comprises, at least functionally, three shifting elements such that by the selective actuation of the first and the second shifting element different gears can be engaged between the drive input shaft and the drive output shaft. In each of the gears a power flow takes place from the drive input shaft via the planetary gearsets to the drive output shaft. In this case at least two gears with different transmission ratios between the drive input shaft and the drive output shaft can be engaged.

In the context of the invention, to say that a first, second, and third shifting element are provided "at least functionally," means that in the electric vehicle transmission according to the invention at least the function of these three shifting elements is reproduced. The three shifting elements may actually be present physically as individual shifting elements, or their function is reproduced by some other component such as a shifting device that combines the function of two or more shifting elements.

The invention now rests on the technical principle that the second element of the first planetary gearset and the first element of the third planetary gearset are connected rotationally fixed to one another. Furthermore, the third element of the first planetary gearset and the first element of the second planetary gearset are connected rotationally fixed to one another, whereas the second element of the second planetary gearset is immobilized. Likewise, the third element of the third planetary gearset is immobilized, while in contrast the second element of the third planetary gearset is connected rotationally fixed to the drive output shaft. The third element of the second planetary gearset can be connected rotationally fixed by means of the first shifting element to the second element of the first planetary gearset and the first element of the third planetary gearset, and in addition the third element can be brought into rotationally fixed connection with the second element of the third planetary gearset by means of the second shifting element. Moreover, two of the elements of the second planetary gearset or of the third planetary gearset can be connected rotationally fixed to one another by means of the third shifting element.

In the electric vehicle transmission according to the invention the first element of the first planetary gearset is permanently connected rotationally fixed to the drive input shaft, whereby the drive input shaft and the first element of the first planetary gearset always rotate at the same rotation speed. In addition, the second element of the first planetary gearset and the first element of the third planetary gearset are permanently connected rotationally fixed to one another so that the second element of the first planetary gearset and the first element of the third planetary gearset always rotate at the same rotation speed. Likewise, the third element of the first planetary gearset and the first element of the second planetary gearset are also permanently connected rotationally fixed to one another so that the third element of the first planetary gearset and the first element of the second planetary gearset always rotate at the same rotation speed. Furthermore, both the second element of the second planetary gearset and also the third element of the third planetary gearset are each permanently immobilized and are therefore both permanently prevented from rotating. The second element of the third planetary gearset is permanently connected rotationally fixed to the drive output shaft, whereby the drive output shaft and the second element of the third planetary gearset always rotate at the same rotation speed.

In the context of the invention, the respective permanent rotationally fixed connections are in each case realized by means of shafts which can be made integrally in one piece, or in more than one piece. Furthermore, within the framework of the invention a design can also be considered in which the shaft concerned is made integrally with one, or even with both of the components connected rotationally fixed to it. The latter configuration is used in particular when the components permanently connected to one another are arranged spatially closely adjacent to one another.

For the permanent immobilization, the element of the electric vehicle transmission concerned is in particular connected rotationally fixed to a permanently fixed structural element, which can be a transmission housing of the electric vehicle transmission, part of the transmission housing or a component connected rotationally fixed thereto. If appropriate, the element of the electric vehicle transmission can be made integrally with the permanently immobilized structural element.

Closing the first shifting element results in a rotationally fixed connection between the third element of the second planetary gearset and the second element of the first planetary gearset and the first element of the third planetary gearset, whereby the third element of the second planetary gearset and the first element of the third planetary gearset rotate together. On the other hand, if the second shifting element is changed to a closed condition, then the third element of the second planetary gearset is connected rotationally fixed to the second element of the third planetary gearset and therefore also to the drive output shaft, so that the third element of the second planetary gearset, the second element of the third planetary gearset and the drive output shaft rotate at the same rotation speed.

In the electric vehicle transmission according to the invention, besides the first shifting element and the second shifting element a third shifting element is also provided, which in its closed condition produces a rotationally fixed connection between two elements of the second planetary gearset. Alternatively, the third shifting element produces a rotationally fixed connection between two elements of the third planetary gearset. Consequently, actuation of the third shifting element results in blocking of the second planetary gearset or of the third planetary gearset. Since in the second planetary gearset the second element is permanently immobilized, blocking of the second planetary gearset also immobilizes the whole of the second planetary gearset and by extension also the whole of the electric vehicle transmission.

Likewise, in the variant of the invention in which the third shifting element connects two of the elements of the third planetary gearset rotationally fixed to one another, the resulting blocking of the third planetary gearset immobilizes the whole of the third planetary gearset and by extension the electric vehicle transmission as well, since the third element of the third planetary gearset is permanently immobilized.

The design of an electric vehicle transmission according to the invention has the advantage that, for one thing, different gear ratios between the drive input shaft and the drive output shaft can be engaged by virtue of the first and second shifting elements, whereby in the installed condition of the electric vehicle transmission a gear ratio of a drive movement of an electric machine with different transmission ratios is also possible. On the other hand, by means of the third shifting element the electric vehicle transmission can be blocked, whereby a parking lock function can be realized. This can be achieved in a simple manner and with a transmission of compact structure.

In accordance with an embodiment of the invention, when actuated the third shifting element connects the first element of the second planetary gearset rotationally fixed to the third element of the second planetary gearset. Alternatively, in its actuated condition the third shifting element connects the second element of the second planetary gearset and the third element of the second planetary gearset rotationally fixed to one another. In both cases the second planetary gearset is blocked thereby, which owing to the permanently immobilized condition of the second element of the second planetary gearset also immobilizes the whole of the second planetary gearset and hence the entire electric vehicle transmission. Correspondingly, in that way the function of the parking brake of the transmission can be realized.

Alternatively, or in addition to the aforesaid embodiment, the shifting elements are in the form of interlock-type shifting elements which can be in the form of unsynchronized claw-type shifting elements. A design of the shifting elements as interlocking shifting elements has the advantage that in an open condition of the shifting element concerned no drag losses, or only very small drag losses, occur at the shifting element. This can improve the efficiency of the electric vehicle transmission.

The aforesaid variant can be combined with the preceding embodiment, wherein the first, second, and third shifting elements are formed by a common shifting device whose coupling element can be moved to different shift positions in which in each case the coupling element functionally reproduces a respective actuated condition of one of the shifting elements. Advantageously, a selective actuation of the three shifting elements can be carried out by means of a common actuator unit whose coupling element changes one shifting element to its actuated condition in each case, depending on its shift position. Thereby the number of components of the electric vehicle transmission and therefore also the production costs can be reduced and a more compact structure achieved. That is possible because in this variant the third element of the second planetary gearset is always coupled and no simultaneously actuated condition of two shifting elements can be reached. In one design, besides the shift positions the coupling element can also be moved to at least one neutral position in which no rotationally fixed connection is produced by the coupling element.

As an alternative to the above design option, however, the function of the parking brake can also be realized by means of the third shifting element in that by a rotationally fixed connection of the first and second elements of the second planetary gearset to one another the second planetary gearset is locked by the third shifting element, and is thereby blocked. As a further alternative, however, the function of the parking brake can also be realized in principle if two of the elements of the third planetary gearset are connected rotationally fixed to one another by the third shifting element. Thus, the third shifting element can connect the first and second elements of the third planetary gearset, or the first and third elements of the third planetary gearset, or the second and third elements of the third planetary gearset rotationally fixed to one another. Although in this variant the first and second shifting elements can be formed by a common shifting device with a coupling element, the third shifting element must in this case be present as a stand-alone shifting element.

Furthermore, in the context of the invention, individual or even more than one of the shifting elements can be in the form of frictional shifting elements and can in that case be in particular in the form of disk-type shifting elements. Advantageously, this enables the shifting element concerned to be actuated under load. Moreover, individual or more than one shifting element can be interlocking shifting elements in the form of locking synchronizers.

Corresponding with a design option of the invention, the drive output shaft is coupled to a differential gear system. In this case the differential gear system is a transverse differential in the form of a bevel gear differential. By way of the transverse differential a drive input movement transmitted to the drive output shaft of the electric vehicle transmission is distributed to drive output shafts of a drive axle of the electric vehicle. In particular, the drive output shaft of the differential gear system is coupled to a differential cage of the differential gear system, wherein the coupling can be produced in that the drive output shaft is connected rotationally fixed to the differential cage or, however, the drive output shaft carries a spur gear which engages with a drive differential lock of the differential cage. Moreover, the differential gear system can also be a longitudinal differential by way of which a drive power can be distributed to more than one drive axle.

According to an embodiment of the invention, the planetary gearsets are arranged at a connection point of the drive input shaft that serves to couple the drive input shaft to the electric machine, in the sequence first planetary gearset, second planetary gearset and third planetary gearset. In that way a suitable structure of the electric vehicle transmission can be produced. In the context of the invention, however, following the axial direction of the drive input shaft at the connection point the planetary gearsets can be arranged in a different sequence. In a further development of the aforesaid embodiment the first shifting element, the second shifting element, and the third shifting element are arranged between the second planetary gearset and the third planetary gearset.

With the electric vehicle transmission according to the invention, a first gear between the drive input shaft and the drive output shaft is obtained by closing the first shifting element, whereas a second gear between the drive input shaft and the drive output shaft can be engaged by closing the second shifting element. Advantageously, in that way a suitable choice of gears of the electric vehicle transmission is realized by an appropriate power flow via the three planetary gearsets. By closing the third shifting element, according to the invention the function of a parking brake of the electric vehicle transmission is also realized. Further gears are possible by virtue of additional shift positions. For example, in another shift position the second shifting element can connect the second and third planetary gearsets and thereby provide a third gear.

An object of the invention is also a drive system for an electric vehicle, in which besides an electric machine an electric vehicle transmission according to one or more of the variants described above is provided. In this case a rotor of the electric machine is coupled to the drive input shaft of the electric vehicle transmission, wherein the coupling is in particular in the form of a rotationally fixed connection between the rotor of the electric machine and a connection point of the drive input shaft. Alternatively, however, one or more intermediate gear ratio steps could also be provided between the drive input shaft of the electric vehicle transmission and the rotor of the electric machine, which gear ratio steps could in detail be in the form of spur gear stages or planetary stages.

The electric machine of the drive system according to the invention can in this case, in particular, be operated on the one hand as an electric motor and on the other hand as a generator, in order in the first case to produce a drive movement for propelling the electric vehicle whereas in the second case the electric vehicle can be braked by means of the electric machine (recuperation). In that case the electric machine can be designed to be fast running.

In a further development of a drive system according to the invention, the first planetary gearset of the electric vehicle transmission is arranged axially overlapping and radially inside the electric machine. This produces a nested configuration of the drive system which results in an overall axially compact structure.

A drive system connecting to one or more of the aforesaid variants is in particular part of a vehicle drivetrain which is in this case provided for an electric vehicle. The drive system can be arranged parallel to a drive axle, with the drive output shaft of the electric vehicle transmission coupled to the drive output shafts of the drive axle. Advantageously, in that way a more compact structure of a drive axle with the drive system can be produced, wherein the coupling between the drive output shaft of the electric vehicle transmission and the drive output shafts of the drive axle is in particular effected by way of a differential gear system. Furthermore, in this case the drive system is in particular arranged above the drive axle.

In the context of the invention a vehicle drivetrain of this type is provided in an electric vehicle which, in particular, is an electric utility vehicle. The electric vehicle can then in particular be an electrically powered transporter.

In the context of the invention, if two components of the electric vehicle transmission are said to be "connected" or "coupled" or "brought into connection" with one another in a rotationally fixed manner, this means that the components are coupled permanently so that they cannot rotate independently of one another. Accordingly, between those structural elements, which can be elements of the planetary gearsets and/or shafts and/or a rotationally fixed structural element of the transmission, no shifting element is provided but rather, the corresponding structural elements are coupled to one another with a fixed rotation speed ratio.

In contrast, if a shifting element is provided at least functionally between two structural elements, then the structural elements are not permanently coupled in a rotationally fixed manner to one another, but rather, a rotationally fixed coupling is only produced by actuating the shifting element positioned at least functionally between them. In the context of the invention actuating the shifting element means that the shifting element concerned is brought to a closed condition and as a result the structural elements directly coupled thereto undergo equalized rotation movements. In the case when the shifting element concerned is in the form of an interlocking shifting element, the structural elements connected directly to one another by it rotate at the same rotation speed, whereas in the case of a frictional shifting element, even if the shifting element has been actuated there may be rotation speed differences between the structural elements. Nevertheless, in the context of the invention, the desired or even undesired condition is said to be a rotationally fixed connection of the respective structural elements by means of the shifting element.

BRIEF DESCRIPTION OF THE DRAWINGS

Advantageous embodiments of the invention, which are explained in what follows, are illustrated in the drawings which show:

FIG. 3: An example of a shifting scheme of an electric vehicle transmission of the drivetrain according to FIG. 2.

DETAILED DESCRIPTION

Figure 1:
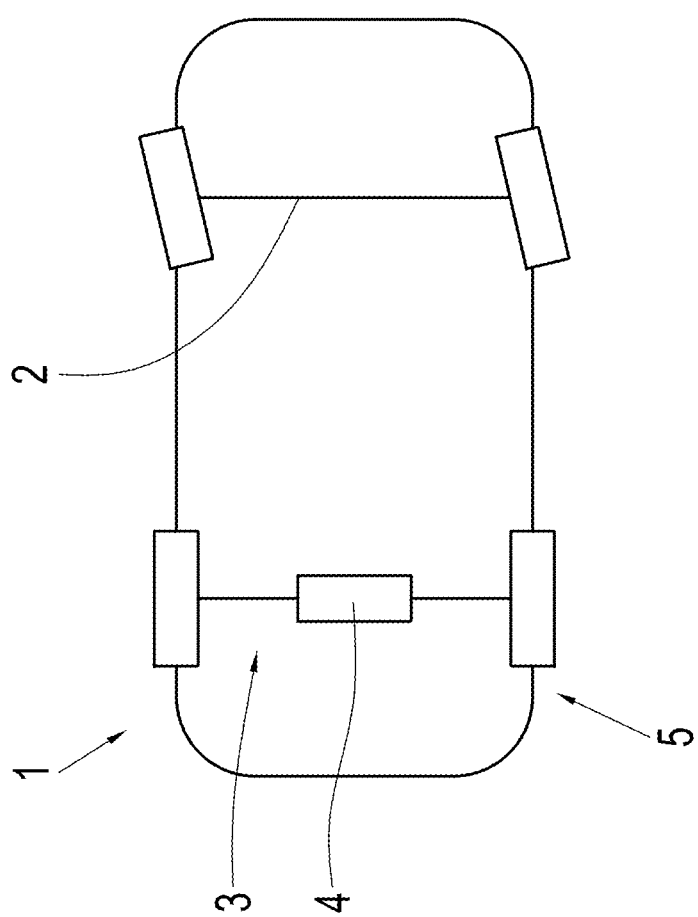
FIG. 1: A schematic representation of an electric vehicle that corresponds to an embodiment of the invention.

FIG. 1 shows a schematic view of an electric vehicle 1, which in particular is an electric utility vehicle such as a transporter. Besides a steerable non-driven axle 2, the electric vehicle 1 also has a drive axle 3 which, together with a drive system 4, is part of a vehicle drivetrain 5. Whereas the vehicle axle 2 is a front axle of the electric vehicle 1, the drive axle 3 is a rear axle of the electric vehicle 1. However, alternatively or in addition to the drive axle 3 the vehicle axle 2 could also be designed as a driven axle.

Figure 2:
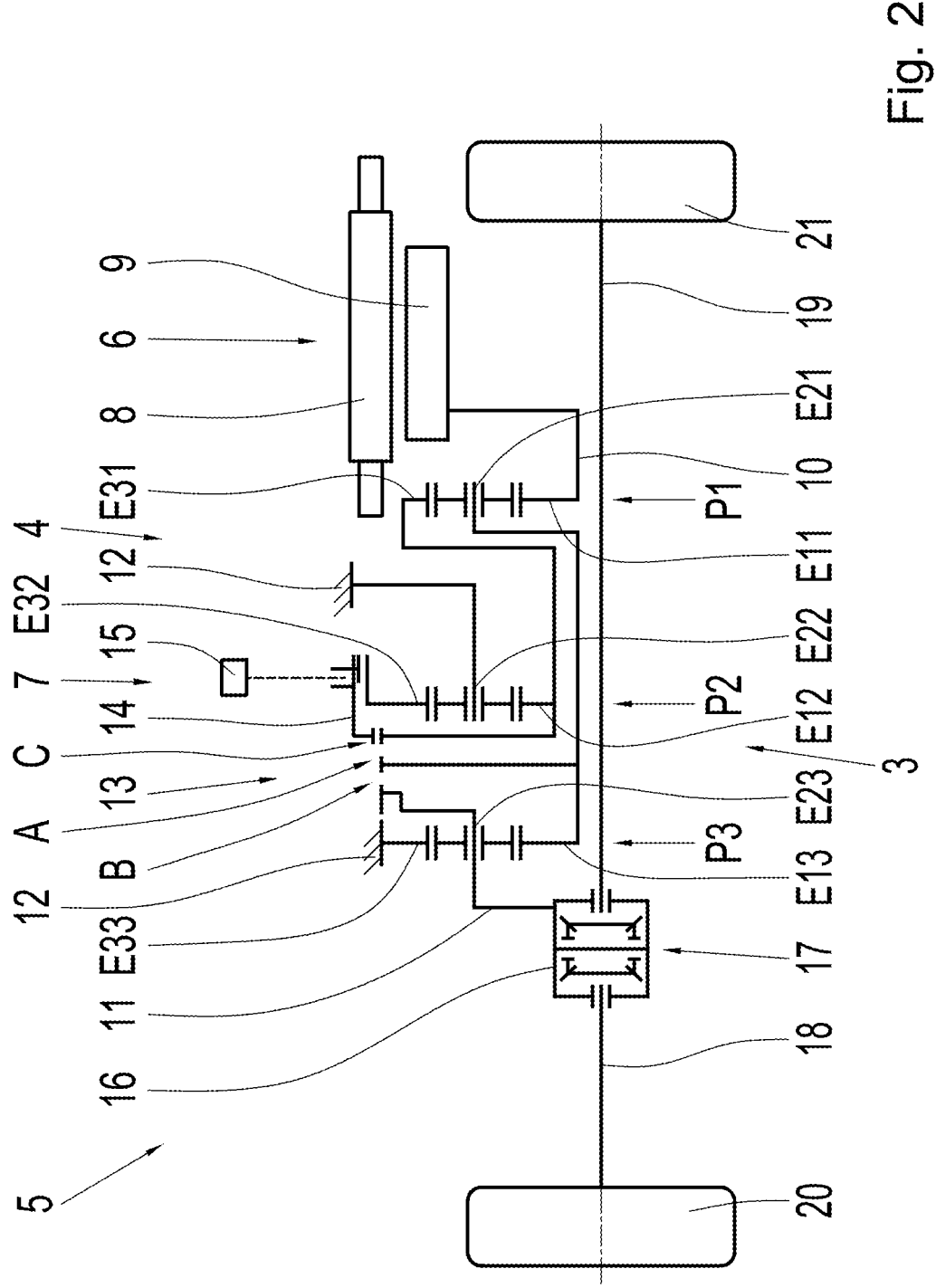
FIG. 2: A schematic representation of a drivetrain of the electric vehicle according to FIG. 1.

FIG. 2 now shows the vehicle drivetrain 5 in the area of the drive axle 3 in greater detail, wherein the vehicle drivetrain 5 is realized in accordance with a possible design of the invention. As can be seen, the drive system 4 consists of an electric machine 6 and an electric vehicle transmission 7 which is designed in accordance with an embodiment of the invention. In a manner whose principle is familiar to those with a knowledge of the subject, the electric machine 6 comprises a stator 8 and a rotor 9 and the electric machine 6 can be operated on the one hand as a generator and on the other hand as an electric motor.

Besides a drive input shaft 10 and a drive output shaft 11 the electric vehicle transmission 7 comprises three planetary gearsets P1, P2, and P3, each comprising respectively a first element E11, E12, or E13, a second element E21, E22, or E23, and a third element E31, E32 or E33. In this case the respective first elements E11, E12, or E13 of the planetary gearsets P1, P2, and P3 are sun gears, whereas the respective second elements E21, E22, or E23 of the planetary gearsets P1, P2, and P3 are planetary webs. In addition, the respective third elements E31, E32, or E33 of the of the planetary gearsets P1, P2, and P3 are ring gears of the planetary gearsets P1, P2, and P3.

On the respective planetary web of the planetary gearset P1, P2, and P3 concerned, in each case at least one planetary gearwheel is mounted to rotate, which meshes both with the sun gear and with the ring gear of the planetary gearset P1, P2, or P3 concerned. Accordingly, in this case the planetary gearsets P1, P2, and P3 are all minus planetary gearsets. However, in the context of the invention it could also be considered to design one or more of the planetary gearsets P1 to P3 as plus planetary gearsets, for which purpose, compared with the respective designs as minus planetary gearsets, the respective second element E21, E22, or E23 would consist of the ring gear in each case and the respective third element E31, E32, or E33 would consist of the planetary web in each case. Furthermore, in a design of the respective planetary gearsets as plus planetary gearsets the stationary gear ratio of each planetary gearset would be increased by one compared with a design as minus planetary gearsets.

In a plus planetary gearset at least one planetary gearwheel pair is mounted to rotate on the planetary web concerned, and of these planetary gearwheels one meshes with the respective sun gear and one with the respective ring gear. In addition, the planetary gearwheels of the at least one pair of gearwheels mesh with one another.

In the present case the first element E11 of the first planetary gearset P1 is connected rotationally fixed to the drive input shaft 10, which shaft is also connected rotationally fixed to the rotor 9 of the electric machine 6. Accordingly, the first element E11 of the first planetary gearset P1 is also connected rotationally fixed to the rotor 9 by way of the drive input shaft 10, so that the first element E11 and the rotor 9 always rotate at the same rotation speed. In the context of the invention, the first element E11 of the first planetary gearset P1 can be made in one piece with the drive input shaft 10.

The second element E21 of the first planetary gearset P1 is permanently connected rotationally fixed to the first element E13 of the third planetary gearset P3, so that these two elements E21 and E 13 also always rotate at the same rotation speed. Likewise, the third element E31 of the first planetary gearset P1 and the first element E12 of the second planetary gearset P2 are permanently connected rotationally fixed to one another and therefore always rotate with one another. The respective rotationally fixed connections are in this case made by intermediate shafts.

As can also be seen in FIG. 2, the second element E22 of the second planetary gearset P2 is immobilized against a rotationally fixed structural element 12 and thus permanently prevented from rotating. In this case the rotationally fixed structural element 12 is a transmission housing of the electric vehicle transmission 7, part of such a housing, or a component connected rotationally fixed thereto. The third element E33 of the third planetary P3 is also immobilized against the rotationally fixed component 12 so that the third element E33 of the third planetary gearset P3 is also permanently prevented from rotating. In contrast the second element E23 of the third planetary gearset P3 is connected rotationally fixed to the drive output shaft 11 of the electric vehicle transmission 7, so that the second element E23 always rotates together with the drive output shaft 11. In this case the second element E23 of the third planetary gearset P3 can be made in one piece with the drive output shaft 11.

The electric vehicle transmission 7 also comprises, functionally, three shifting elements A, B, and C which in this case are present in the form of a common shifting device 13, each of which is designed as an interlocking shifting element, namely an unsynchronized claw-type shifting element in each case. When the shifting element A is actuated the third element E32 of the second planetary gearset P2, the second element E21 of the first planetary gearset P1 and the first element E13 Of the third planetary gearset P3 are connected rotationally fixed to one another, while in its closed state the shifting element B connects the third element E32 of the second planetary gearset P2 rotationally fixed to the drive output shaft 11 and thus also to the second element E23 of the third planetary gearset P3. In its closed state the shifting element C produces a rotationally fixed connection between the first element E12 of the second planetary gearset P2 and the third element E32 of the second planetary gearset P2. In addition to the two gears indicated, a further shift position can provide a third gear. In that case the actuator 15 actuates a shifting element in such manner that it is positioned between the actuated shifting element A and the actuated shifting element B, and at the same time the sleeve slides out of the third element E32 of the second planetary gearset P2. Thereby. the drive output shaft 11 and hence also the second element E23 of the third planetary gearset P3 would be connected to the first element E13 of the third planetary gearset P3 and with the second element E21 of the first planetary gearset P1.

In the present case the shifting device 13 comprises a coupling element 14 in the form of a sliding sleeve. This coupling element 14 is rotationally fixed relative to the third element E32 of the second planetary gearset P2 but can be displaced axially over it so that the coupling element 14 can be moved by an associated actuator 15 to various axial positions. Besides neutral positions the coupling element 14 can move to various shift positions in each of which the coupling element 14 produces a respective actuated state of one of the shifting elements A, B, or C. Thus, in a first shift position the shifting element A is actuated, in a second shift position the shifting element B is actuated and in a third shift position the shifting element C is actuated.

Besides the second element E23 of the third planetary gearset P3, the drive output shaft 11 is also permanently connected rotationally fixed to a differential cage 16 of a differential gear system 17. In this case the differential gear system 17 is in the form of a bevel gear differential which, in a manner whose principle is known to those familiar with the field, distributes a drive power fed in from the drive output shaft 11 to drive output shafts 18 and 19 of the drive axle 3. To the drive output shafts 18 and 19 are drivingly connected respective drive wheels 20 and 21 of the drive axle 3.

In the present case the drive system 4 is arranged parallel to the drive axle 3 and axially between the drive wheels 20 and 21. In this case the electric machine 6 is arranged axially close to the drive wheel 21, in such manner that the first planetary gearset P1 of the electric vehicle transmission 7 is positioned axially at the level of and radially inside the stator 8 of the electric machine 6. Axially, the first planetary gearset P1 is followed first by the second planetary gearset P2 and then by the further planetary gearset P3 and the differential gear system 17, wherein the latter together with the planetary gearsets P1 to P3 can be accommodated in a common housing of the electric vehicle transmission 7. The shifting device 13 is located axially between the second planetary gearset P2 and the third planetary gearset P3.

Figure 3:
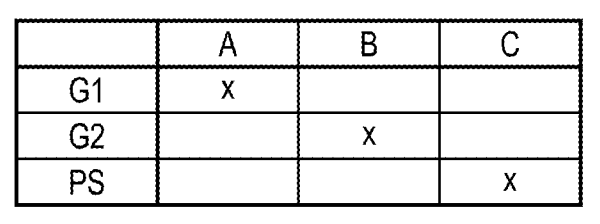

Finally, FIG. 3 shows an example shifting scheme of the electric vehicle transmission 7 according to FIG. 2. In this it can be seen that a first gear G1, a second gear G2 and in addition a parking brake function PS can be produced by the electric vehicle transmission 7, wherein the table of FIG. 3 indicates by means of an X which of the functionally present shifting elements A, B or C must be actuated in order to obtain the respective gears G1 or G2 or the parking brake PS.

Thus, the first gear G1 between the drive input shaft 10 and the drive output shaft 11 is obtained by closing the shifting element A, whereas to obtain the second gear G2 between the drive input shaft 10 and the drive output shaft 11 the shifting element B has to be actuated. In each of the two gears G1 and G2, a power flow can pass between the drive input shaft 10 and the drive output shaft 11, and hence also between the electric machine 6 and the drive output shafts 18 and 19 of the drive axle 3.

In contrast the parking brake PS is actuated by closing the shifting element C, whereby owing to the rotationally fixed connection between the first element E12 and the third element E32 of the second planetary gearset P2 the planetary gearset P2 is blocked. Since the second element E22 of the second planetary gearset P2 is permanently immobilized against the rotationally fixed structural element 12, this also immobilizes the second planetary gearset P2 and thus too the electric vehicle transmission 7 and the drive output shafts 18 and 19 of the drive axle 3 as well. Consequently, this can also prevent the electric vehicle 1 from inadvertently moving away from a parking place.

By virtue of the design of an electric vehicle transmission according to the invention, besides engaging different gears it is also possible to realize a parking brake in a compact manner.

INDEXES

1 Electric vehicle
2 Vehicle axle
3 Drive axle
4 Drive system
5 Vehicle drivetrain
6 Electric machine
7 Electric vehicle transmission
8 Stator
9 Rotor
10 Drive input shaft
11 Drive output shaft
12 Rotationally fixed structural element
13 Shifting device
14 Coupling element
15 Actuator
16 Differential cage
17 Differential gear system
18 Drive output shaft
19 Drive output shaft
20 Drive wheel
21 Drive wheel
P1 First planetary gearset
P2 Second planetary gearset
P3 Third planetary gearset
E11 First element of the first planetary gearset
E21 Second element of the first planetary gearset
E31 Third element of the first planetary gearset
E12 First element of the second planetary gearset
E22 Second element of the second planetary gearset
E32 Third element of the second planetary gearset
E13 First element of the third planetary gearset
E23 Second element of the third planetary gearset
E33 Third element of the third planetary gearset
A Shifting element
B Shifting element
C Shifting element
G1 First gear
G2 Second gear
PS Parking brake

The invention claimed is:

1. An electric vehicle transmission comprising:
a drive input shaft;
a drive output shaft;
a first planetary gearset;
a second planetary gearset;
a third planetary gearset,
wherein the drive input shaft is configured to be coupled to an electric machine;
wherein the first planetary gearset, each of the second planetary gearset and the third planetary gearset comprises a first element, a second element and a third element, respectively in the form of a sun gear, a planetary web, and a ring gear;
wherein:
at least functionally a first shifting element, a second shifting element and a third shifting element are provided;
the first element of the first planetary gearset is connected rotationally fixed to the drive input shaft;
the second element of the first planetary gearset is connected rotationally fixed to the first element of the third planetary gearset;
the third element of the first planetary gearset is connected rotationally fixed to the first element of the second planetary gearset;
the second element of the second planetary gearset is immobilized;
the third element of the third planetary gearset is immobilized;
the second element of the third planetary gearset is connected rotationally fixed to the drive output shaft;
the third element of the second planetary gearset is configured to be connected rotationally fixed by means of the first shifting element to the second element of the first planetary gearset and to the first element of the third planetary gearset, and is further configured to be brought into rotationally fixed connection by means of the second shifting element with the second element of the third planetary gearset; and
two of the elements of the second planetary gearset or of the third planetary gearset can be connected rotationally fixed to one another by means of the third shifting element.

2. The electric vehicle transmission according to claim 1, wherein when actuated, the third shifting element connects together the first element of the second planetary gearset and the third element of the second planetary gearset.

3. The electric vehicle transmission according to claim 1, wherein the shifting elements are in the form of unsynchronized claw-type shifting elements.

4. The electric vehicle transmission according to claim 2 wherein the first shifting element, the second shifting element, and the third shifting element are present in the form of a common shifting device having a coupling element configured to be moved to different shift positions in which the coupling element produces, functionally in each case, an actuated state of one of the shifting elements.

5. The electric vehicle transmission according to claim 1, wherein the drive output shaft is coupled to a differential gear system.

6. The electric vehicle transmission according to claim 1, wherein the planetary gearsets are arranged at a connection point of the drive input shaft that serves to couple the drive input shaft to the electric machine, in a sequence first planetary gearset, second planetary gearset, and third planetary gearset.

7. The electric vehicle transmission according to claim 6, wherein the first shifting element, the second shifting element, and the third shifting element are arranged axially between the second planetary gearset and the third planetary gearset.

8. The electric vehicle transmission according to claim 1, wherein a first gear between the drive input shaft and the drive output shaft is obtained by closing the first shifting element and a second gear between the drive input shaft and the drive output shaft is obtained by closing the second shifting element.

9. A drive system for an electric vehicle, comprising an electric machine and the electric vehicle transmission according to claim 1, wherein a rotor of the electric machine is coupled to the drive input shaft of the electric vehicle transmission.

10. The drive system according to claim 9, wherein the first planetary gearset of the electric vehicle transmission is arranged axially overlapping and radially inside the electric machine.

11. A vehicle drivetrain comprising the drive system according to claim 9.

12. The vehicle drivetrain according to claim 11, wherein the drive system is arranged parallel to a drive axle, and the drive output shaft of the electric vehicle transmission is coupled to drive output shafts of the drive axle.

13. An electric vehicle having a vehicle drivetrain comprising:
an electric machine; and
the electric vehicle transmission according to claim 1;
wherein a rotor of the electric machine is coupled to the drive input shaft of the electric vehicle transmission.

14. The electric vehicle according to claim 13, wherein the rotor of the electric machine is arranged parallel to a drive axle, and wherein the drive output shaft of the electric vehicle transmission is coupled to drive output shafts of the drive axle.

15. The electric vehicle according to claim 13, wherein when actuated, the third shifting element connects the first element of the second planetary gearset to the third element of the second planetary gearset in a rotationally fixed manner.

16. The electric vehicle according to claim 15, wherein the shifting elements are in the form of interlocking shifting elements.

17. The electric vehicle according to claim 16, wherein the first shifting element, the second shifting element, and the third shifting element are present in the form of a common shifting device having a coupling element configured to be moved to different shift positions in which the coupling element produces, functionally in each case, an actuated state of one of the shifting elements.

18. The electric vehicle of claim 17, wherein the drive output shaft is coupled to a differential gear system.

19. The electric vehicle according to claim 18, wherein the planetary gearsets are arranged at a connection point of the drive input shaft that is configured to couple the drive input shaft to the electric machine, in a sequence first planetary gearset, second planetary gearset, and third planetary gearset.

20. The electric vehicle according to claim 19,
wherein the first shifting element, the second shifting element, and the third shifting element are arranged axially between the second planetary gearset and the third planetary gearset; and
wherein a first gear between the drive input shaft and the drive output shaft is obtained by closing the first shifting element and a second gear between the drive input shaft and the drive output shaft is obtained by closing the second shifting element.

* * * * *